US006786539B2

(12) United States Patent
De Gaillard

(10) Patent No.: US 6,786,539 B2
(45) Date of Patent: Sep. 7, 2004

(54) MOTOR VEHICLE WITH A CLOSEABLE ROOF OPENING

(75) Inventor: Francois De Gaillard, Mouilleron en pareds (FR)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/363,390

(22) PCT Filed: Aug. 14, 2002

(86) PCT No.: PCT/EP02/09100

§ 371 (c)(1),
(2), (4) Date: Mar. 3, 2003

(87) PCT Pub. No.: WO03/018341

PCT Pub. Date: Mar. 6, 2003

(65) Prior Publication Data

US 2003/0197401 A1 Oct. 23, 2003

(30) Foreign Application Priority Data

Aug. 21, 2001 (DE) ........................ 101 39 977

(51) Int. Cl.$^7$ ............................................... B60J 7/047
(52) U.S. Cl. .............. 296/220.01; 296/147; 296/146.14
(58) Field of Search ........................... 296/220.01, 219, 296/146.14, 147

(56) References Cited

U.S. PATENT DOCUMENTS 2,694,598 A * 11/1954 Ulrich ........................ 296/219

| 5,421,635 | A | 6/1995 | Reinsch |
| 5,484,185 | A | 1/1996 | Salz et al. |
| 5,540,478 | A | 7/1996 | Schüch |
| 5,897,160 | A | 4/1999 | Reihl et al. |
| 6,129,413 | A | 10/2000 | Klein |
| 6,287,589 | B1 | 9/2001 | Drapeau |
| 6,474,731 | B2 * | 11/2002 | De Gaillard ........... 296/220.01 |
| 2002/0005657 | A1 | 1/2002 | Farber |

FOREIGN PATENT DOCUMENTS

| DE | 41 29 852 A1 | | 3/1993 | |
| DE | 296 01 330 U1 | | 6/1996 | |
| EP | 922384 | * | 9/1998 | |
| EP | 0 934 842 A2 | | 8/1999 | |
| GB | 2 184 404 A | | 6/1987 | |
| JP | 4627 | * | 1/1983 | ................. 296/215 |

* cited by examiner

Primary Examiner—Dennis H. Pedder
(74) Attorney, Agent, or Firm—Nixon Peabody LLP; David S. Safran

(57) ABSTRACT

A motor vehicle (1) with a vehicle roof (2) with a sequence of cover elements (8) which are guided on roof-mounted guides for selective closing or at least partial clearance of a roof opening (6) in the vehicle roof (2), and the cover elements (8) can be swung out and are located stacked in their swung out position on the back end of the roof opening (6) for complete clearance of the roof opening (6), the roof opening (6) extending as far as the rear trunk lid (9). The cover elements are louvers (8) of a louvered roof (7) and at least the rear louvers, which in their rear closed position are located in the rear window area, are transparent louvers or glass louvers. In this configuration, the cover elements or louvers (8) are located in a compact stacked arrangement in the area above the hat rack (11).

10 Claims, 3 Drawing Sheets

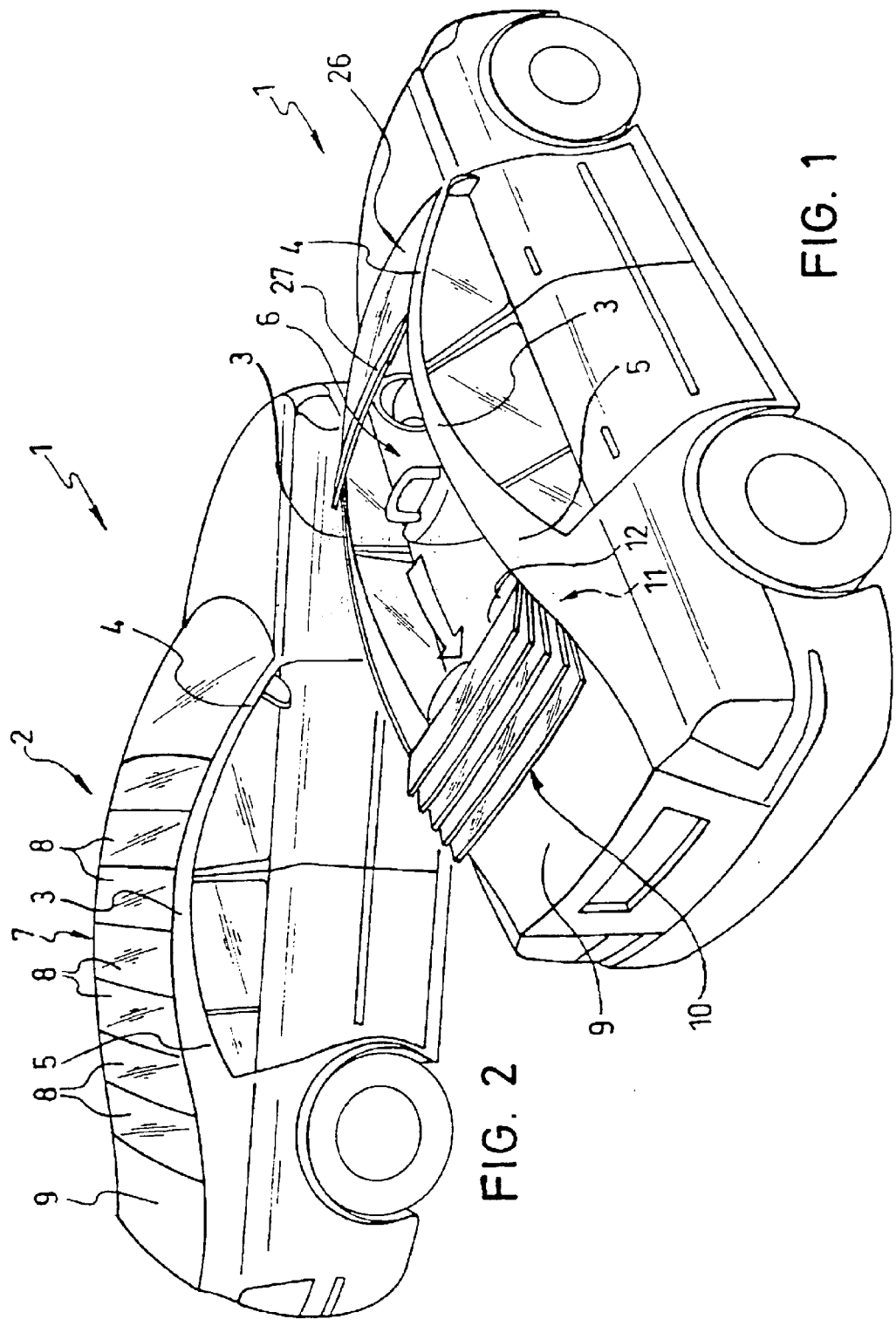

MOTOR VEHICLE WITH A CLOSEABLE ROOF OPENING

BACKGROUND OF THE INVENTION

1. Field of the Invention

The invention relates to a motor vehicle, especially a limousine, sedan or coupe, with a vehicle roof with a sequence of cover elements which are guided on roof-mounted guides for selective closing or at least partial clearance of a roof opening in the vehicle roof, and the cover elements can be swung out and are located stacked in their swung-out position on the back end of the roof opening for complete clearance of the roof opening.

2. Description of the Related Art

Published European Patent Application EP 0 591 644 B1 discloses a motor vehicle roof with a sequence of louvers which are intended for selective closing or at least partial clearance of a roof opening in the vehicle roof and are guided on roof-mounted guides. When the louvered roof is opened the louvers are moved to under the fixed roof part which adjoins the roof opening to the rear and are located stacked there in the stored position. One version calls for the louvers to be horizontally aligned and spaced apart from one another from the rear window. The roof opening thus has the conventional size in the fixed roof surface.

Published European Patent Application EP 0 922 384 A2 discloses a motor vehicle in which between the lateral lengthwise roof members of a continuous rear roof a front roof part and a rear roof part are movably supported in order to selectively close a large roof opening or at least partially clear it. The two roof parts can be pushed to the rear onto a continuous rear window frame on top of one another and together with the continuous rear window frame which contains a rear window, they are swung around a transverse pivot axis into a lowered position into the vehicle interior so that a large roof opening in the manner of a semi- or quasi-cabaret is formed. The roof parts and the continuous rear window frame however require a large storage space within the vehicle.

SUMMARY OF THE INVENTION

The object of the invention is to devise a motor vehicle of the initially mentioned type with a vehicle roof which has a clearable roof opening that is as large as possible and which requires as little storage space as possible, or none at all, for the lowered cover elements in the motor vehicle or in the trunk.

This object is achieved in accordance with the invention in the aforementioned motor vehicle in that the roof opening extends as far as the rear trunk lid. While in the initially mentioned motor vehicle roofs either a fixed rear window is located in the fixed roof structure or a rear window in its entirety is removed from the roof opening, as a result of its size, however, the window represents a part which requires a large storage space and which is very unwieldy when lowered, the roof elements which are formed to be comparatively short in the lengthwise direction of the vehicle, in their raised stacked arrangement can be deposited on the back end of the roof opening without storage space in the trunk or in the stowage space behind the seats and under a hat rack being required. The cleared roof opening, which extends into the area of the trunk lid, yields a cabaret-like motor vehicle which still has the advantages of increased safety due to the lateral lengthwise roof members. The roof opening extends as far as the trunk lid, the term trunk lid being defined as any body part which is located at the top on the vehicle rear, such as, for example, the cover of the engine compartment of a motor vehicle with a rear-mounted engine or also a fixed, flat outside body part.

The cover elements are feasibly louvers of a louvered roof and at least the rear louvers are transparent and form a transparent roof section in the manner of a rear window. The louvers are especially glass louvers.

The roof-mounted guides can be located directly on body-mounted lengthwise roof members which laterally border the roof opening. Alternatively, the cover elements or louvers can be supported on the guides of an insert frame which is located laterally on the lengthwise roof members. In this way, the prefabricated louvered roof can be mounted with low installation effort on the motor vehicle roof.

Such an insert frame of the louvered roof then also contains the bearing means for the louvers and a drive means for moving the louvers.

To increase the strength and stiffness of the insert frame, and thus also of the roof structure, the frame can have a transverse link or transverse bracing which is located between its front end and its back end. At least one sunshade can be located on this cross connection. The cross connection is feasibly located above the head area of the back seat passengers.

For water management on the louvered roof, at least one gutter is formed, preferably on the insert frame.

One embodiment of the motor vehicle is explained in detail below with reference to the drawings.

BRIEF DESCRIPTION OF THE DRAWINGS

FIG. 1 shows a perspective overhead view of a motor vehicle with a glass louvered roof which is supported on the lengthwise roof members on both sides in the opened rear lowered position;

FIG. 2 shows, in a side perspective, the motor vehicle with a closed glass louvered roof;

DETAILED DESCRIPTION OF THE INVENTION

Figure 3:
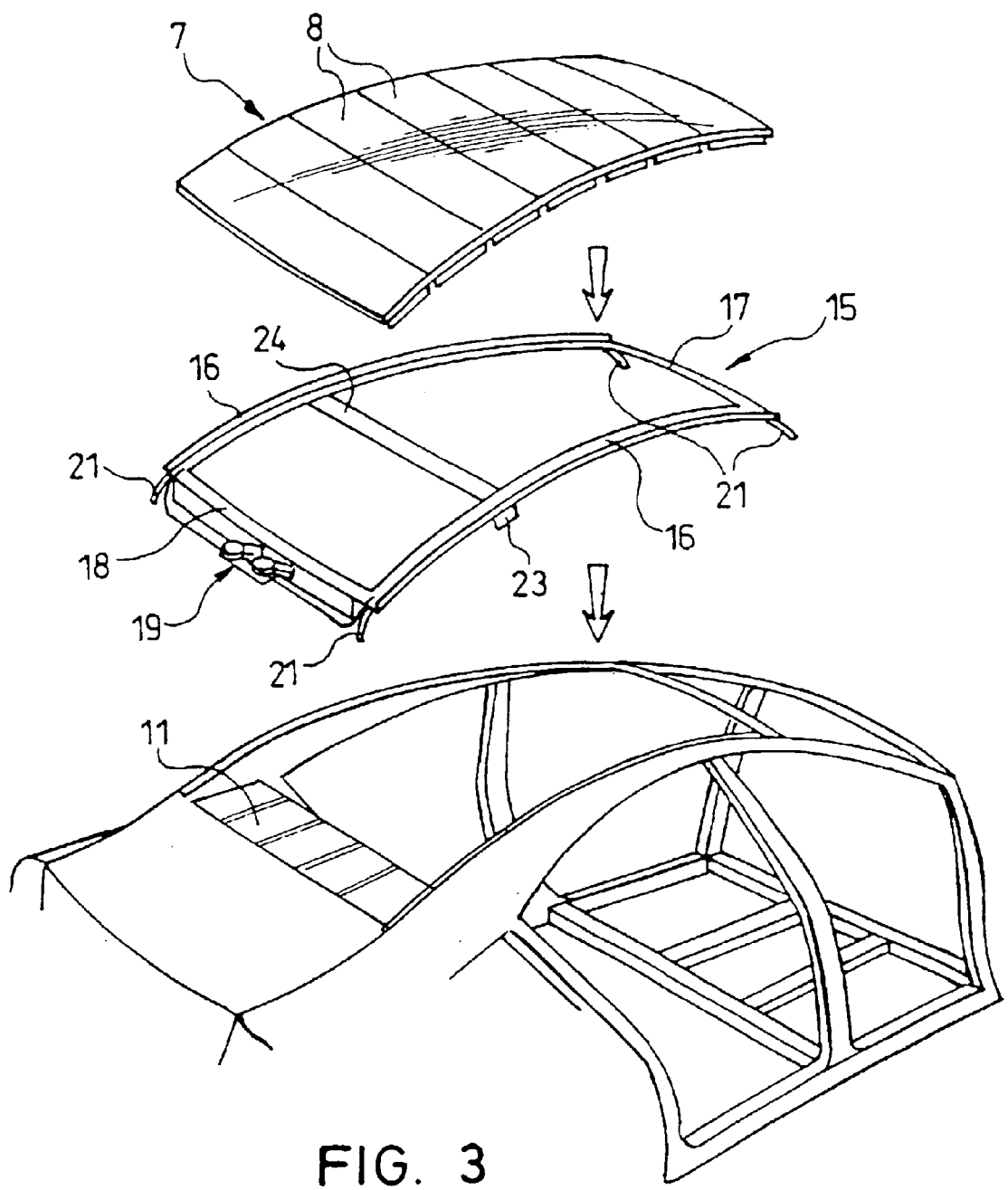
FIG. 3 is an exploded perspective overhead view of the shell of the motor vehicle with the insert frame of the louvered roof, which frame supports the louvers.

A motor vehicle 1 (see FIGS. 1 and 2), in the illustrated embodiment, a four or five seat sedan or limousine, for example, with a continuous roof in the manner of a coupe, has a motor vehicle roof 2 with lateral lengthwise roof members 3 which adjoin the A-column 4 at the front, and pass to the rear into the C-columns 5, or assume their function. The roof opening 6 extends between the two lengthwise roof members 3, and it can be selectively closed by a roof closing means in the form of a louvered roof 7 with individual louvers 8 of glass (see FIG. 1) or the roof opening 6 can be at least partially cleared (FIG. 2). The basic structure of the louvered roof is described, for example, in DE 196 08 916 C1 which corresponds to U.S. Pat. No. 5,897,160 or EP 0 978 400 A2 which corresponds to published U.S. patent application User. No. 2002/0005657 A1, to which reference is made here. The roof opening 6 extends between the lengthwise roof members 3 and the C-columns 5 to the rear as far as the trunk lid 9. The louvers 8 are supported on each side to move on a respective guide rail and to be ratable at their rear edge 10.

To open the louvered roof 7 and to clear the roof opening 6, the louvers 8 are pushed to the rear by a drive means (not shown in FIGS. 1 and 2) and are stacked on one another in their raised position, and thus, lowered in a space-saving manner in package form at the end of the roof opening 6. Depending on the configuration of the motor vehicle roof 2, or the lengthwise roof members 3, for example, they are located roughly over a hat rack 11 (location shown by the broken-line arrow in FIG. 1) behind the back seats 12. In this lowered position, neither in the vehicle interior nor in the trunk is storage space required.

A long roof opening 6 is enabled since the rear window, which is conventionally present, is formed by the movable louvers 8 of the louvered roof 7, and thus, can be lowered divided and in a space-saving manner.

Since only the lengthwise roof members 3 laterally border the roof opening 6 and the lowered louvers 8 are located on the back end of the long roof opening 6, with the roof opened, the passengers acquire the impression of a semi- or quasi-cabaret with increased safety due to the vehicle-mounted lengthwise roof members 3.

Figure 4:
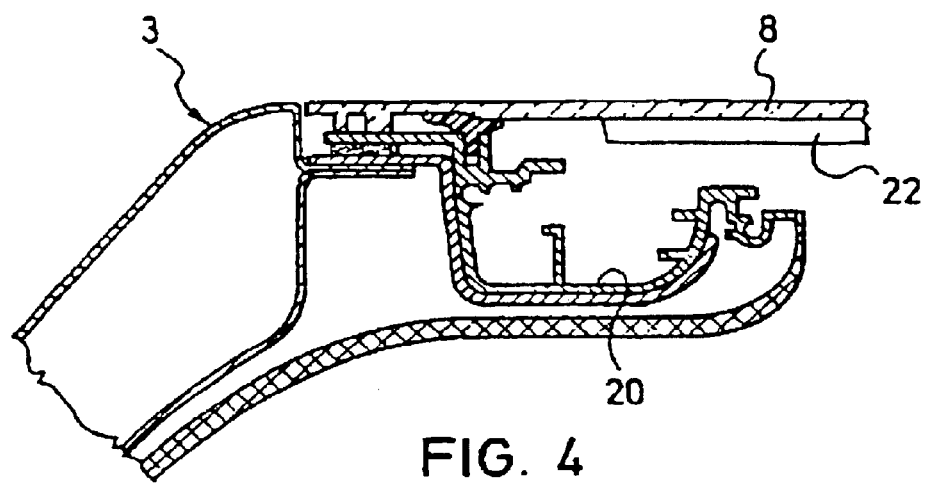
FIG. 4 shows, in a cross section, a lengthwise roof member with an insert frame.

The louvers 8 are, for example, supported on the bilateral guide rails which are attached directly to the lengthwise roof members 3. In one alternative version, the louvered roof 7 is located entirely on an insert frame 15 (FIG. 3) which has a lengthwise rail 16 on each side for supporting the bearing means of the individual louvers 8, a front narrow cross connection 17 between the two lengthwise rails 16 and the rear cross connection 18 with a drive means 19 for moving the louvers 8. The insert frame 15 also contains a preferably peripheral gutter 20 (see FIG. 4) on the lengthwise rails 16 and connecting tubes 21 which are located in the corner areas for water drainage. The gutter 20 drains water which is collected on the transverse gutter 22 (FIG. 4) which is attached to each louver 8 on its front or rear edge, and with the louvered roof closed, fits under the joint between the two louvers 8. The insert frame 15 is inserted as a prefabricated module into the roof opening and is attached to the body. Attachment takes placed by cementing onto the roof frame or by screwing to the holding tongues 23 which are attached to the insert frame 15 or to the roof frame.

Figure 5:
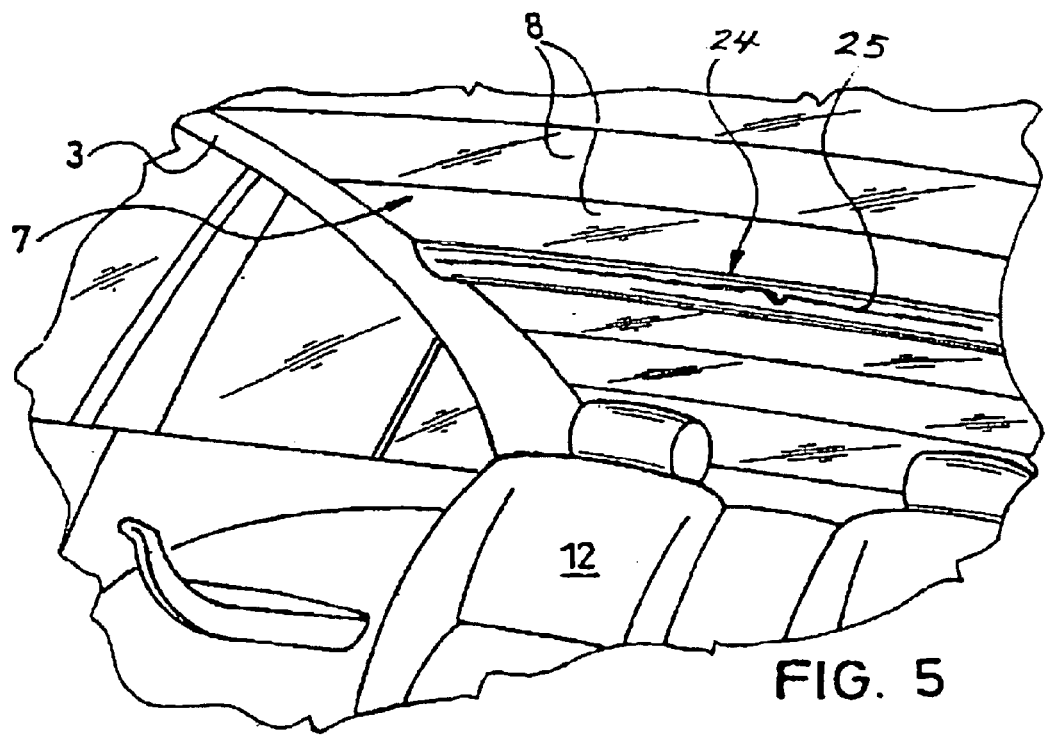
FIG. 5 shows an inside view of a portion of the closed glass louvered roof.

A sunshade 25 (see FIG. 5), which can be pulled forward or backwards, or also two sunshades, can be supported on a stiffening cross connection 24 which is located roughly in the head area of the back seat passengers in order to shade the front section or the rear section of the louvered roof 7, if necessary, to the desired degree.

On the apron above the front window 26, there can also be a ratable wind deflector 27, for example, of glass. The wind deflector 27 can also be formed by a first front louver of the louvered roof 7 which is not displaced to the rear when the roof is being opened.

What is claimed is:

1. Motor vehicle, comprising:

a vehicle body having a rear trunk with a rear trunk lid;

a vehicle roof mounted to the vehicle body and having roof-mounted guides at each of lateral sides of the roof;

a roof opening formed in vehicle roof between the roof-mounted guides and extending rearward to a rear end of the roof opening which is located at the rear trunk lid;

a movable roof formed of a series of cover elements which are guided on the roof-mounted guides for selective closing and at least partial clearance of the roof opening in the vehicle roof, the cover elements being stackable in a swung-out, fully opened position at a back end of the roof opening for clearing a major portion of the roof opening; wherein the cover elements are louvers of a louvered roof, and wherein at least rear louvers are transparent and have a closed position in which a rear window area of the roof is formed by the transparent rear louvers.

2. Motor vehicle as claimed in claim 1, wherein the cover elements have a compact stacked arrangement in an area above a hat rack in said fully opened position.

3. Motor vehicle as claimed in claim 1, wherein the roof-mounted guides are located on body-mounted lengthwise roof members which laterally border the roof opening.

4. Motor vehicle as claimed in claim 1, wherein the roof-mounted guides are located on an insert frame which is located laterally on lengthwise roof members which laterally border the roof opening.

5. Motor vehicle as claimed in claim 4, wherein the insert frame has a cross connection between a front end and a back end of the insert frame.

6. Motor vehicle as claimed in claim 5, wherein a sunshade is located on the cross connection.

7. Motor vehicle as claimed in claim 6, wherein the cross connection is located above a head area for back seat passengers.

8. Motor vehicle as claimed in claim 5, wherein the cross connection is located above a head area for back seat passengers.

9. Motor vehicle as claimed in claim 7, wherein the insert frame has a gutter.

10. Motor vehicle as claimed in claim 4, wherein the insert frame has a gutter.

* * * * *